United States Patent [19]
Chen

[11] Patent Number: 5,131,245
[45] Date of Patent: Jul. 21, 1992

[54] AUTOMOBILE STEERING LOCK

[75] Inventor: Shih-Yu Chen, Tainan, Taiwan

[73] Assignee: All Ship Enterprise Co., Ltd., Tainan, Taiwan

[21] Appl. No.: 594,979

[22] Filed: Oct. 10, 1990

[51] Int. Cl.⁵ .............................................. B60R 25/02
[52] U.S. Cl. ...................................... 70/209; 70/226; 70/380
[58] Field of Search ................ 70/209, 211, 212, 225, 70/226, 237, 238, 380

[56] References Cited

U.S. PATENT DOCUMENTS

| | | | |
|---|---|---|---|
| 4,730,470 | 3/1988 | Zane et al. | 70/238 |
| 4,738,127 | 4/1988 | Johnson | 70/209 |
| 4,747,279 | 5/1988 | Solow | 70/211 X |
| 4,887,443 | 12/1989 | Wang | 70/226 X |
| 4,935,047 | 6/1990 | Wu | 70/238 X |

FOREIGN PATENT DOCUMENTS

| | | | |
|---|---|---|---|
| 1127524 | 9/1968 | United Kingdom | 70/226 |
| 2024307 | 1/1980 | United Kingdom | 70/238 |

Primary Examiner—Lloyd A. Gall
Attorney, Agent, or Firm—Morton J. Rosenberg; David I. Klein

[57] ABSTRACT

An antitheft device for attachment to a steering wheel of an automobile comprising an elongated body member having two parallel passageways extending in a longitudinal direction. A first hook is secured to the body member for engagement with a portion of the steering wheel. The first hook engages the wheel from the inside of the rim, with the body member extending outward beyond the periphery of the steering wheel, an elongated rod member, adapted to move in telescopic fashion in one of two passageways formed in the body member, and extending longitudinally therein. A second hook, secured to the rod member, engages the inside portion of the steering wheel at a point diametrically opposed to that of the first hook. A second elongated rod member is adapted to extend in telescopic fashion in a direction opposite to that of the other rod member. A lock assembly is disposed within the body member for engaging the rods within passageways of the body member, allowing the rod members to extend with respect to the body member, and to be locked at any of a plurality of positions.

1 Claim, 4 Drawing Sheets

AUTOMOBILE STEERING LOCK

FIELD OF THE INVENTION

The present invention relates to an automobile antitheft device. More particularly, the present invention is directed to a device for attachment to an automobile steering wheel to prevent complete rotation thereof, and thereby securing the automobile against unauthorized use.

BACKGROUND OF THE INVENTION

Antitheft devices which attach to an automobile steering wheel are known, such as that shown in U.S. Pat. No. 4,738,127 to Johnson. Such antitheft devices for attachment to a steering wheel of an automobile include an elongated body member having a passage extending therethrough. An elongate rod member is adapted to move in telescopic fashion within the passageway of the body member, and opposed hooks are provided for engaging the inside portion of the steering wheel. A lock assembly is associated with the body member, engaging the elongated rod within the passage for locking the rod member in a stationary position with respect to the body member, at any of a plurality of positions. While the antitheft device described above is functional, it includes several defects. For example, such devices present pry points wherein a rigid pin or arcuate ruler-like thin object can be inserted into a gap formed between the passageway and periphery of the rod member. The pin is inserted to reach a spherical bearing of the lock assembly and displace it by overcoming the bias force of a spring member, thereby releasing it from engagement with the rod member and defeating the lock.

SUMMARY OF THE INVENTION

It is accordingly a primary objedc of this invention to provide an automobile steering wheel lock that overcomes the foregoing defects associated with prior art systems.

Another object of this invention is to provide a locking device wherein the locking mechanism is totally enclosed, and provides no area susceptible to prying by a crowbar, rigid pin or the like.

A yet further object of this invention is to provide an automobile steering wheel lock having a mechanism for preventing an extendable rod member from being released by other than by use of a key.

Still further, the object of this invention is to provide an automobile steering wheel lock which is simple in construction, economical to manufacture and easy to use.

DETAILED DESCRIPTION OF A PREFERRED EMBODIMENT

Figure 1:
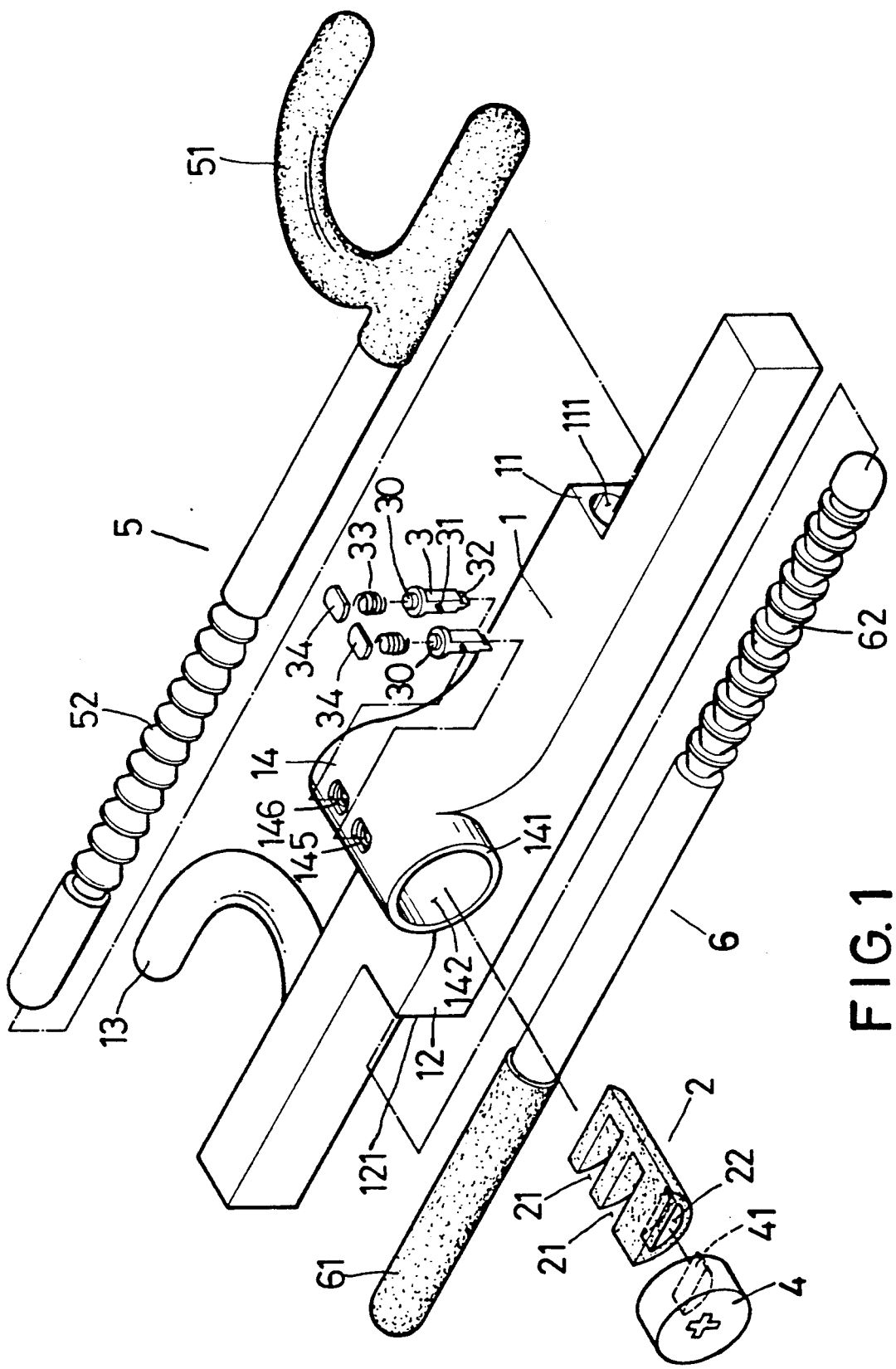
FIG. 1 is a perspective and exploded view of a preferred embodiment of the present invention.

Referring to FIG. 1, there is shown, an automobile steering wheel lock according to the present invention which comprises an elongated body member 1, a first elongated rod member 5 and a second elongated rod member 6. Elongated rod members 5 and 6 are dimensioned to move in telescopic fashion within body member 1. Hooks 13 and 51 are provided for engaging opposing portions of a steering wheel from inside the open portions thereof. Hooks 13 and 51 are respectively provided on the body member 1 and the first rod member 5. A locking assembly including a conventional key lock 4, a locking member 2, and a pair of bearing members 3 are provided within a housing 14 to position and lock the rod members 5 and 6 in a stationary position with respect to the body member 1 at any one of a plurality of positions.

The body member 1 includes two parallel elongated tubes 11 and 12 having a square of rectangular ccross-section contour. Each of tubes 11 and 12 has a respective open end 111, 121, and an opposing closed end, defining a respective central passage extending from the open end 111, 121 to the respective closed end. Openings 111 and 121 of the body member 1 face opposite directions so that the first and second rod members 5, 6 telescope from body member 1 in opposite directions with respect to each other.

Figure 6:
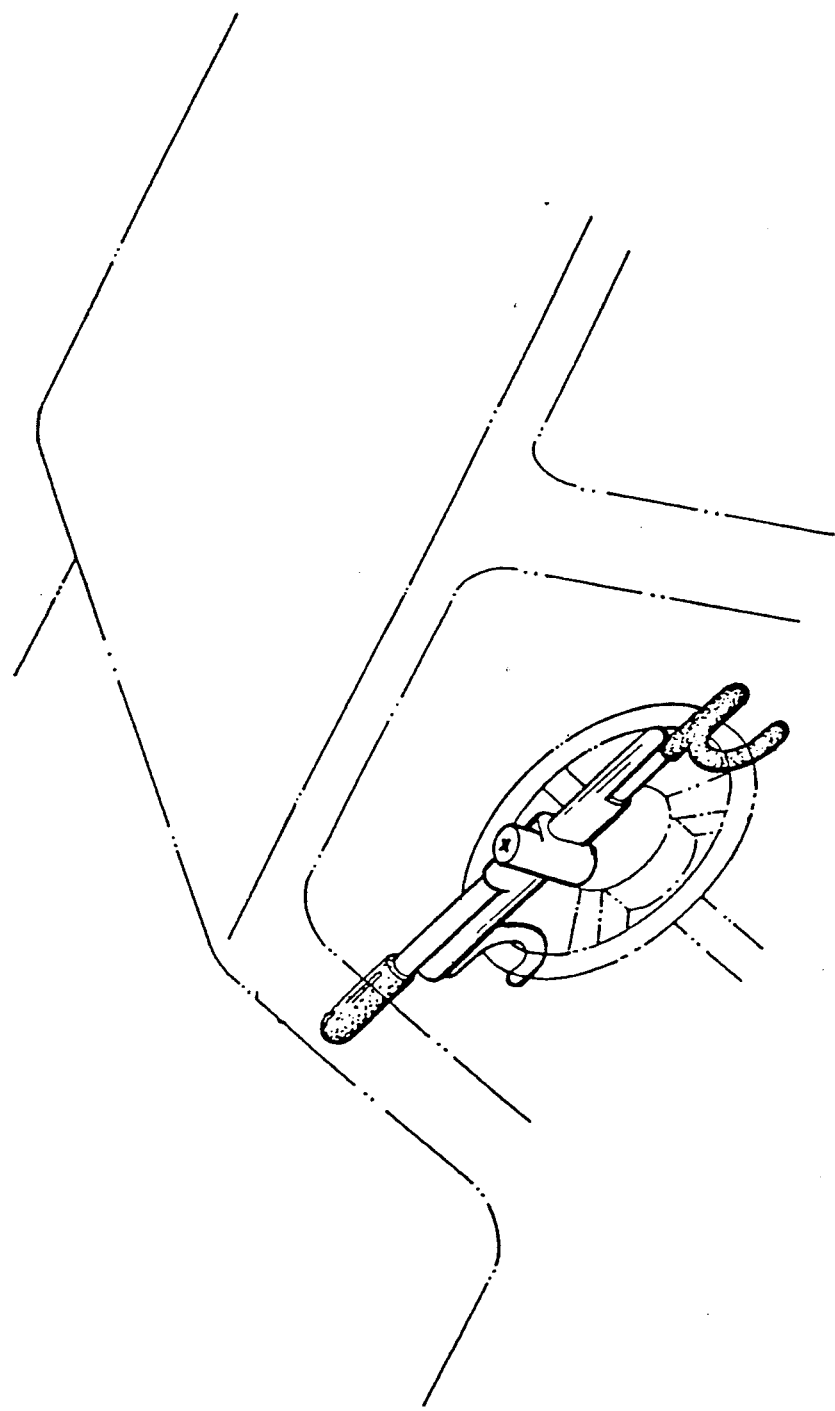

A generally L-shaped member 13 is fixedly secured to the tube 11, by means of welding, to form a hook 13 which opens rearwardly along the body member 1. The rod member 5 is formed by an elongated rod of circular cross-sectional contour having an outer diameter which is dimensioned to be slightly less than the diameter of the first passage 111 formed in tube 11 of body member 1. This allows the rod member 5 to telescope freely within the tube 11. The second generally L-shaped member 51 is fixedly secured to the front end portion of the rod member 5, to form a hook 51. Hook 51 has an open end which faces opposite in direction to that of hook 13, for engagement with a diametrically opposed portion of a steering wheel, as best shown in FIG. 6. A plurality of annular grooves 52 are formed in a major portion of rod member 5, the annular grooves being disposed in parallel spaced relation along the longitudinal axis of rod member 5 for engagement with the lock assembly, as will be described in following paragraphs.

The rod member 6 is formed by an elongated rod having a circular cross-sectional contour with an outer diameter being dimensioned slightly less than the diameter of the passage 121 formed in the tube 12 of body member 1. This enables rod member 6 to telescope freely within the tube 12. A grip 61 is secured to the free end of the second rod 6. A plurality of annular grooves 62 are formed in a major portion of rod member 6.

The lock housing 14 includes a boss 141 integrally offset with respect to parallel axes of the elongated tubes 11 and 12 of body member 1. Housing 14 has a bore 142 formed therethrough, for firmly receiving the locking assembly. The locking assembly includes a conventional key lock 4 with a projection 41 integrally formed to the inner end of the cylindrical key lock 4, a locking member 2, and a pair of bearing members 3.

Figure 2:
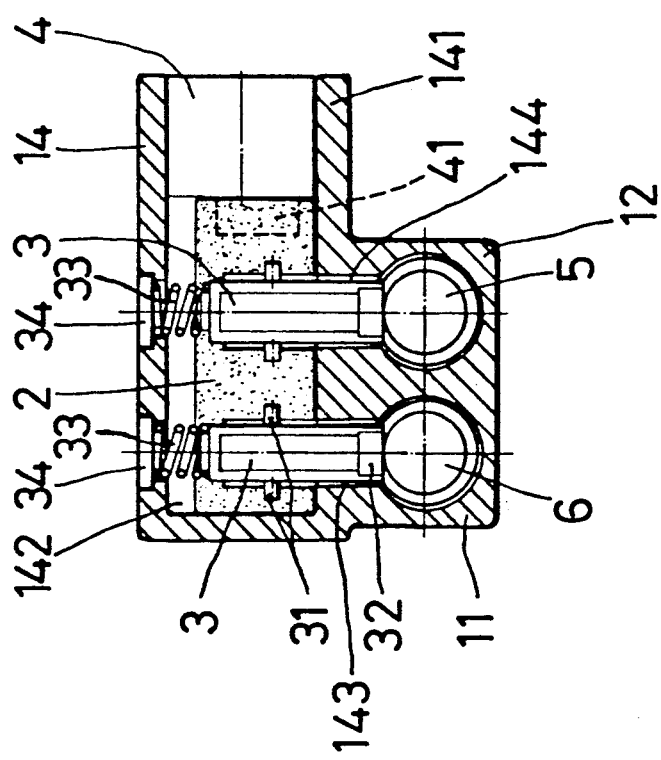
FIG. 2 is an enlarged cross-sectional view of a housing, which is in the assembled and locked condition, illustrating tenon ends of rod-like bearings protruding into corresponding annular grooves of elongated rods.
Figure 4:
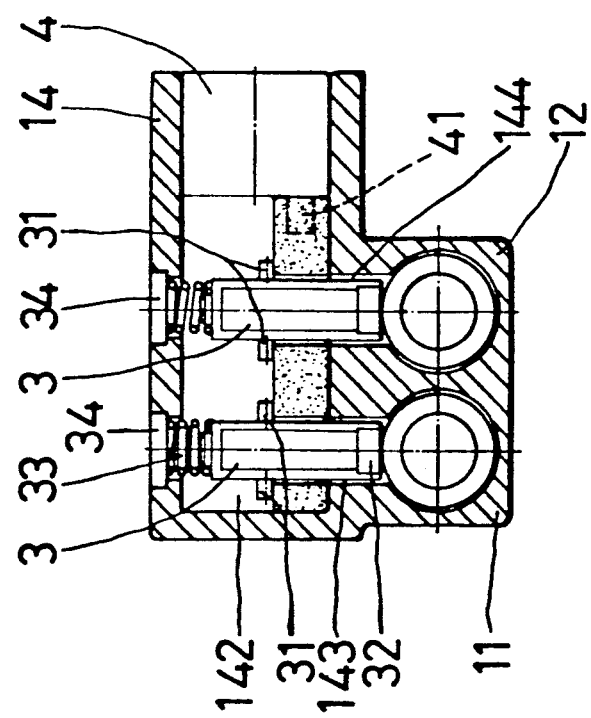
FIG. 4 is an enlarged cross-sectional view of the housing which is in the assembled and unlocked condition, illustrating the tenon ends of the rod-like bearings withdrawn from the annular grooves of the elongated rods.

As shown in FIGS. 2 and 4, the housing 14 includes a second pair of passages 143 and 144. Passages 143 and 144 are vertically bored in a lower portion of the housing 14 to accommodate the bearing members 3. The vertical passages 143 and 144 pass through the bore 142 and respectively through one of the passages 111, 121 of respective elongated tubes 11, 12. Two holes 145 and 146, shown in FIG. 1, are disposed in vertical alignment with the vertical passages 143 and 144, respectively. The holes 145 and 146 are formed in an upper wall of the housing 14 to facilitate the insertion of the bearing members 3 therein. Two metal plats 34 are provided as closures for the holes 145 and 146 by means of a press fit type coupling, subsequent to assembly.

Each of the bearing members 3 are formed by a rod-like member 3 having a projection 30 formed on an upper end for receiving the lower end of a biasing spring 33. An insert end 32 is formed at the opposing end to extend downwardly towards the passage in either of the elongated tubes 11 or 12. Intermediate the ends, bearing member 3 includes a pair of opposed pivots 31. The upper end of each of the biasing springs 33 abuts against inner side of a corresponding metal plate 34 when the device is assembled.

The locking member 2 includes an arcuate outer surface and a flat top defining a semicircular cross-sectional contour. A recess 22 is formed in a side wall adjacent the key lock 4 and two axially spaced cut-off portions extend along a transverse direction from a lateral side thereof.

When assembled, as shown in FIGS. 2-5, the rod-like bearing members 3 are inserted into the respective vertical passages 143 and 144 through the openings 145, 146 and the cylindrical key lock 4 is firmly received in the bore 142 with the projection 41 disposed in the recess 22 of the locking member 2. The locking member 2 is disposed within the bore 142 with the cut-off portions 21 in vertical alignment with the vertical passages 143 and 144 and openings 145 and 146 to support pivots 31 of the bearing members 3. The tenon ends 32 extend downwardly through the spaced cut-off portions 21, whereby the bearing members are vertically displaced responsive to sliding the locking member 2 along the circumferential inner surface of the boss 141 by means of the projection 41. The springs 33, mounted on upper ends of the bearing members 3, are in a compressed state when the metal plates 34 are secured in the respective openings 145, 146.

Figure 3:
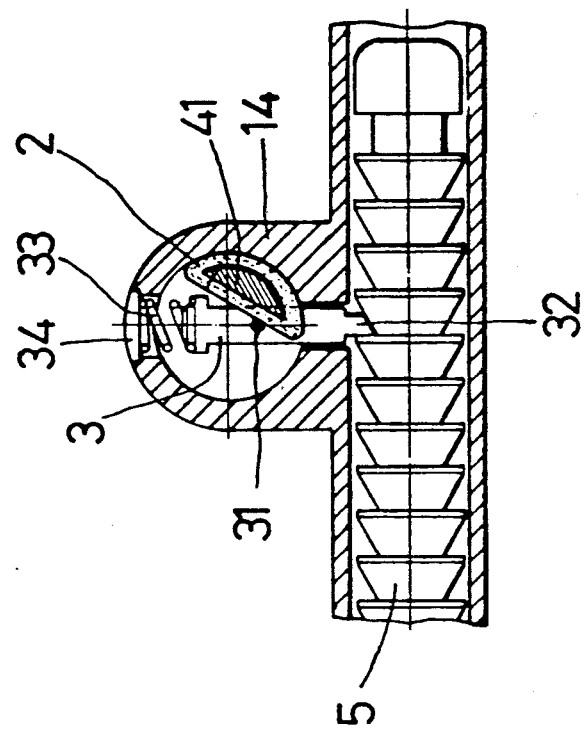
FIG. 3 is an enlarged transverse-sectional view of the housing shown in FIG. 2.

In operation, as shown in FIGS. 2 and 3, the bearing members 3 are biased by the compressed springs 33 toward respective rods 5 and 6. Each of the insert ends 32 extend into a respective annular groove 52, 62 to lock the device when the locking member 2 is rotated from a first position at the bottom of housing 14 to a second position, to one side of the housing 14.

Figure 5:
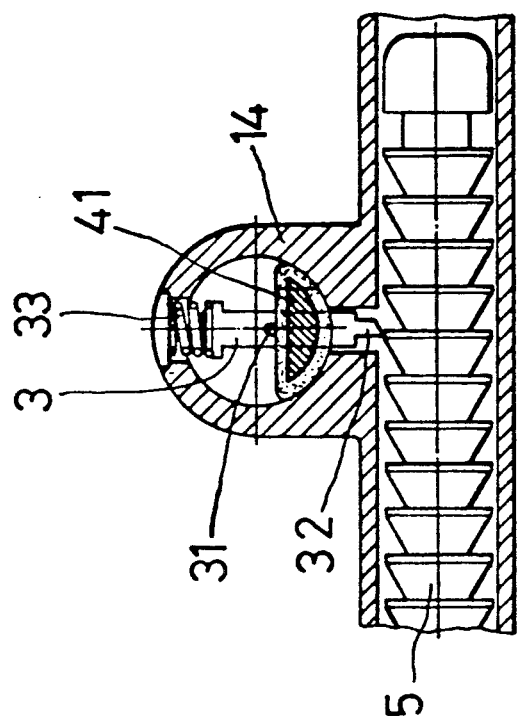
FIG. 5 is an enlarged transverse-sectional view of the housing shown in FIG. 4; and, FIG. 6 is a diagramatically perspective view showing the steering wheel lock of the present invention applied to a steering wheel of a car.

As shown in FIGS. 4 and 5, when the locking member 2 is displaced by the projection 41 of the lock 4 from the second position to the first position, rod members 5 and 6 can move in telescopic fashion within the body member 1, since the insert ends 32 of the bearing members 3 are vertically displaced out of engagement with the respective annular grooves 52, 62. The rod members 5 and 6 can then extend in opposite directions from the body member 1. In this unlocked condition, as shown in FIG. 6, hook 13 is positioned to engage a portion of a steering wheel from the inside of its rim. Then the rod member 5 is telescoped out of the body member 1 until hook 51 engages a diametrically opposed portion of the steering wheel. Next the rod member 6 is telescoped out of the body member 1 into a corner portion of the vehicle interior, such as a corner portion adjacent the front windshield of the car, thereby preventing complete rotation of the steering wheel.

Accordingly, the present invention provides an antitheft device which is quick and simple to use. It will also be appreciated that the present invention because of its configuration presents a formidable obstacle to a potential thief. In this respect, a device according to the present invention provides no external pry points wherein a crowbar or screw driver can be inserted.

While the invention has been described with respect to a preferred embodiment, it is obvious that various modifications can be made therein without departing from the spirit of present invention which should be limited only by the scope of the appended claim.

I claim:

1. An antitheft device for attachment to a steering wheel of an automobile, comprising:
   a longitudinally extended integrally formed housing, said housing including:
   a. a first tubular member extending longitudinally, said first tubular member having a bore extending axially a predetermined distance from an opening formed in a first end of said first tubular member to an opposing second end;
   b. a second tubular member transversely displaced from said first tubular member extending longitudinally in a direction parallel to said first tubular member, said second tubular member having a bore extending axially a predetermined distance from an opening formed in a first end of said second tubular member to an opposing second end;
   c. a substantially L-shaped member coupled to said first tubular member adjacent said second end of said first tubular member and extending therefrom, said L-shaped member defining a hook for engagement with a first rim portion of a steering wheel; and,
   d. a cylindrically shaped boss extending transverse said longitudinal direction of said first and second tubular members, said boss being formed on an upper surface of said first and second tubular members, said boss having a transversely extending cylindrical passage formed therein, said boss having (1) a first through opening extending between said passage and said bore formed in said first tubular member, and (2) a second through opening extending between said passage and said bore formed in said second tubular member;
   a first rod member dimensioned for telescopic receipt within said bore formed in said first tubular member, said first rod member having a plurality of annular grooves formed in axially spaced relation on one end thereof, and having a substantially U-shaped portion formed on an opposing end for engagement with a second rim portion of a steering wheel;
   a second rod member dimensioned for telescopic receipt within said bore formed in said second tubular member, said second rod member having a plurality of annular grooves formed in axially spaced relation on one end thereof; and, locking means disposed within said passage of said boss for releasably coupling said first and second rod members to said housing, said locking means including:

a. a pair of spring biased rod-like bearing members, each of said rod-like bearing members being disposed in a respective one of said first and second through openings formed in said boss, each of said rod-like bearing members having an insert end for respective engagement with one of said plurality of annular grooves of one said respective first or second rod members, each of said rod-like bearing members having a pair of pivot pins extending transversely therefrom;

b. a locking member disposed within said cylindrical passage of said boss, said locking member having (1) an arcuate lower surface conforming to the contour of an inner surface of said cylindrical passage, (2) a substantially flat upper surface, defining a semicircular cross-sectional contour, and (3) a pair of cut-out portions, each of said cut-out portions being aligned with a respective one of said first or second through openings for passage of a portion of a respective one of said pair of rod-like bearing members, said pivot pins of each of said rod-like bearing members being disposed in contact with said upper surface of said locking member for vertical displacement of said rod-like bearing member responsive to rotation of said locking member; and c. a lock rotatively coupled to said locking member for rotatively displacing said locking member responsive to an actuation of said lock.

* * * * *